(12) United States Patent
Mitchell et al.

(10) Patent No.: US 8,718,264 B2
(45) Date of Patent: May 6, 2014

(54) AUTOMATED AGENT AVAILABILITY DETECTION

(75) Inventors: James Mitchell, Windham, NH (US); John Cambray, Belmont, NH (US)

(73) Assignee: Aspect Software, Inc., Chelmsford, MA (US)

( * ) Notice: Subject to any disclaimer, the term of this patent is extended or adjusted under 35 U.S.C. 154(b) by 1343 days.

(21) Appl. No.: 12/125,392

(22) Filed: May 22, 2008

(65) Prior Publication Data
US 2009/0290702 A1 Nov. 26, 2009

(51) Int. Cl.
*H04M 3/00* (2006.01)
*H04M 5/00* (2006.01)
*H04M 11/00* (2006.01)

(52) U.S. Cl.
USPC ............ 379/265.03; 379/100.06; 379/106.08; 379/265.11

(58) Field of Classification Search
USPC ............. 379/100.06, 106.08, 265.01–265.14, 379/266.01–266.08
See application file for complete search history.

(56) References Cited

U.S. PATENT DOCUMENTS

| | | | |
|---|---|---|---|
| 4,694,483 A | 9/1987 | Cheung | 379/34 |
| 4,763,353 A * | 8/1988 | Canale et al. | 379/157 |
| 4,988,209 A | 1/1991 | Davidson et al. | 370/58.2 |
| 5,553,133 A | 9/1996 | Perkins | 379/265 |
| 5,555,179 A | 9/1996 | Koyama | 700/95 |
| 5,765,033 A | 6/1998 | Miloslavsky | 709/206 |
| 5,815,566 A | 9/1998 | Ramot et al. | 379/265 |
| 5,926,539 A | 7/1999 | Shtivelman | 379/266.01 |
| 5,946,375 A | 8/1999 | Pattison et al. | 379/34 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| RE36,416 E | 11/1999 | Szlam et al. | 379/88.09 |
| 6,002,760 A | 12/1999 | Gisby | 379/266.01 |
| 6,018,578 A | 1/2000 | Bondarenko et al. | 379/265 |
| 6,021,428 A | 2/2000 | Miloslavsky | 709/206 |
| 6,041,107 A | 3/2000 | Jones et al. | 379/164 |
| 6,044,145 A | 3/2000 | Kelly et al. | 379/265.02 |
| 6,044,368 A | 3/2000 | Powers | 707/2 |
| 6,067,357 A | 5/2000 | Kishinsky et al. | 379/265.02 |
| 6,108,711 A | 8/2000 | Beck et al. | 709/242 |
| 6,138,139 A | 10/2000 | Beck et al. | 709/202 |
| 6,167,395 A | 12/2000 | Beck et al. | 707/3 |
| 6,170,011 B1 | 1/2001 | Macleod Beck et al. | 709/224 |
| 6,175,563 B1 | 1/2001 | Miloslavsky | 370/352 |
| 6,175,564 B1 | 1/2001 | Miloslavsky | 370/352 |
| 6,185,292 B1 | 2/2001 | Miloslavsky | 379/265.01 |
| 6,192,283 B1 * | 2/2001 | Holowko | 700/28 |
| 6,345,305 B1 | 2/2002 | Beck et al. | 709/242 |
| 6,373,836 B1 | 4/2002 | Deryugin et al. | 370/352 |
| 6,389,007 B1 | 5/2002 | Shenkman et al. | 370/352 |
| 6,393,015 B1 | 5/2002 | Shtivelman | 370/352 |
| 6,732,156 B2 | 5/2004 | Miloslavsky | 709/206 |
| 2007/0025544 A1 * | 2/2007 | Shaffer et al. | 379/266.01 |

* cited by examiner

*Primary Examiner* — Oleg Asanbayev
(74) *Attorney, Agent, or Firm* — Bourque and Associates, PA

(57) ABSTRACT

A system for automatically detecting status of an agent in a call center is provided. The system may have a call center management system with a plurality of agent workstations coupled to the call center management system and a plurality of telephones associated with the agent workstations. The system may also have a switch that automatically connects calls to the telephones. An off-hook detector automatically detects a manually initiated off-hook status of at least one of the telephones and signals the switch that the agent at the telephones is unavailable. The switch may then avoid connecting a call to the unavailable agent.

4 Claims, 4 Drawing Sheets

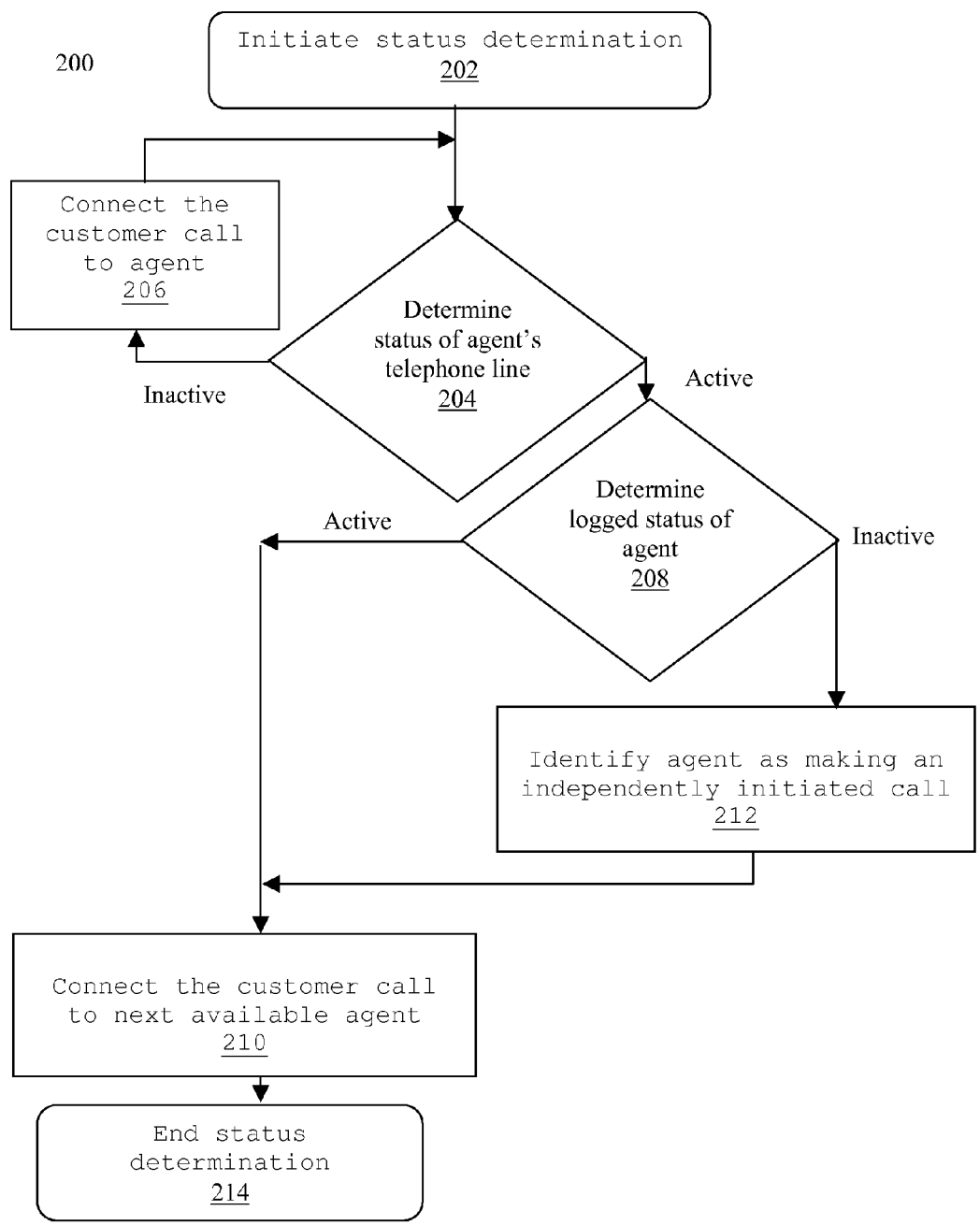

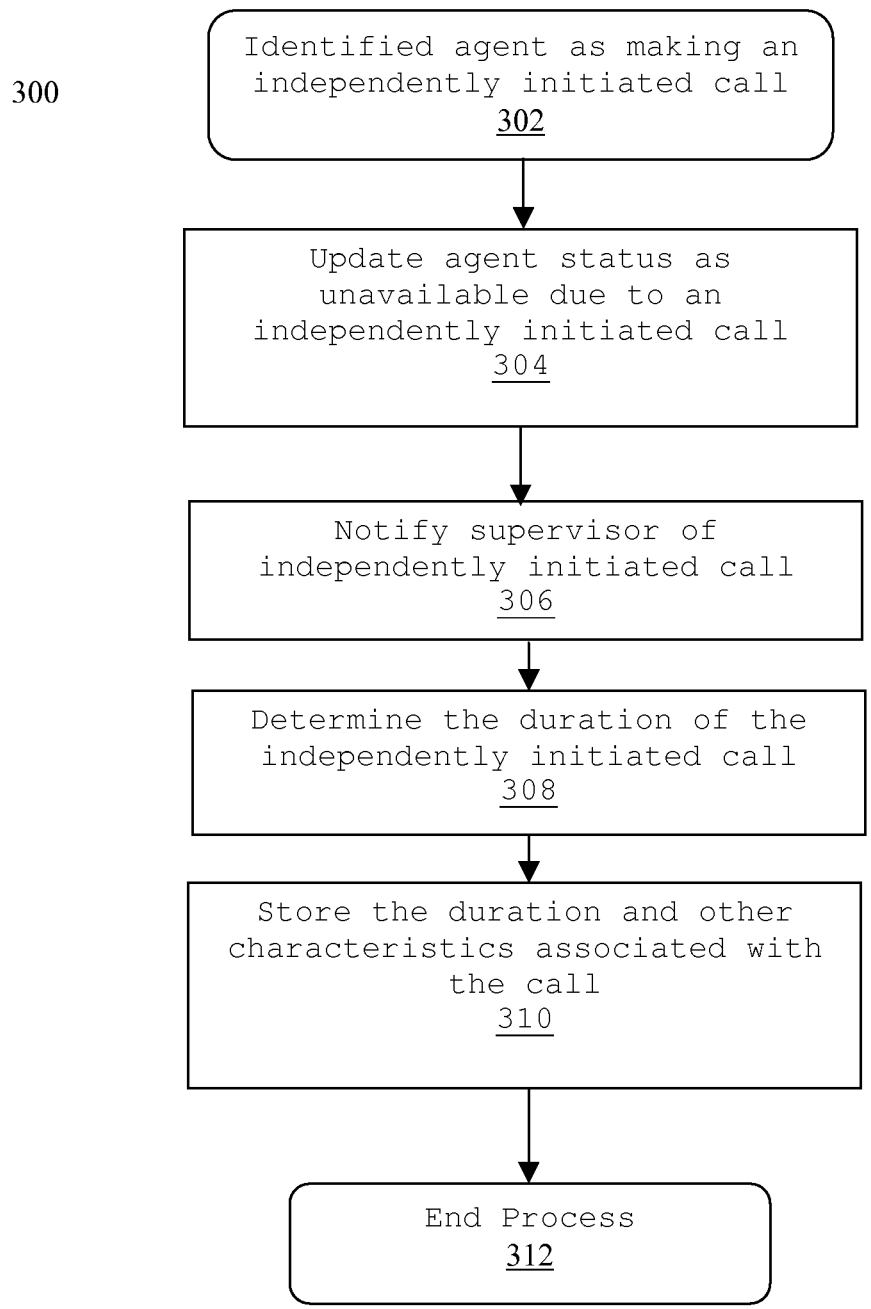

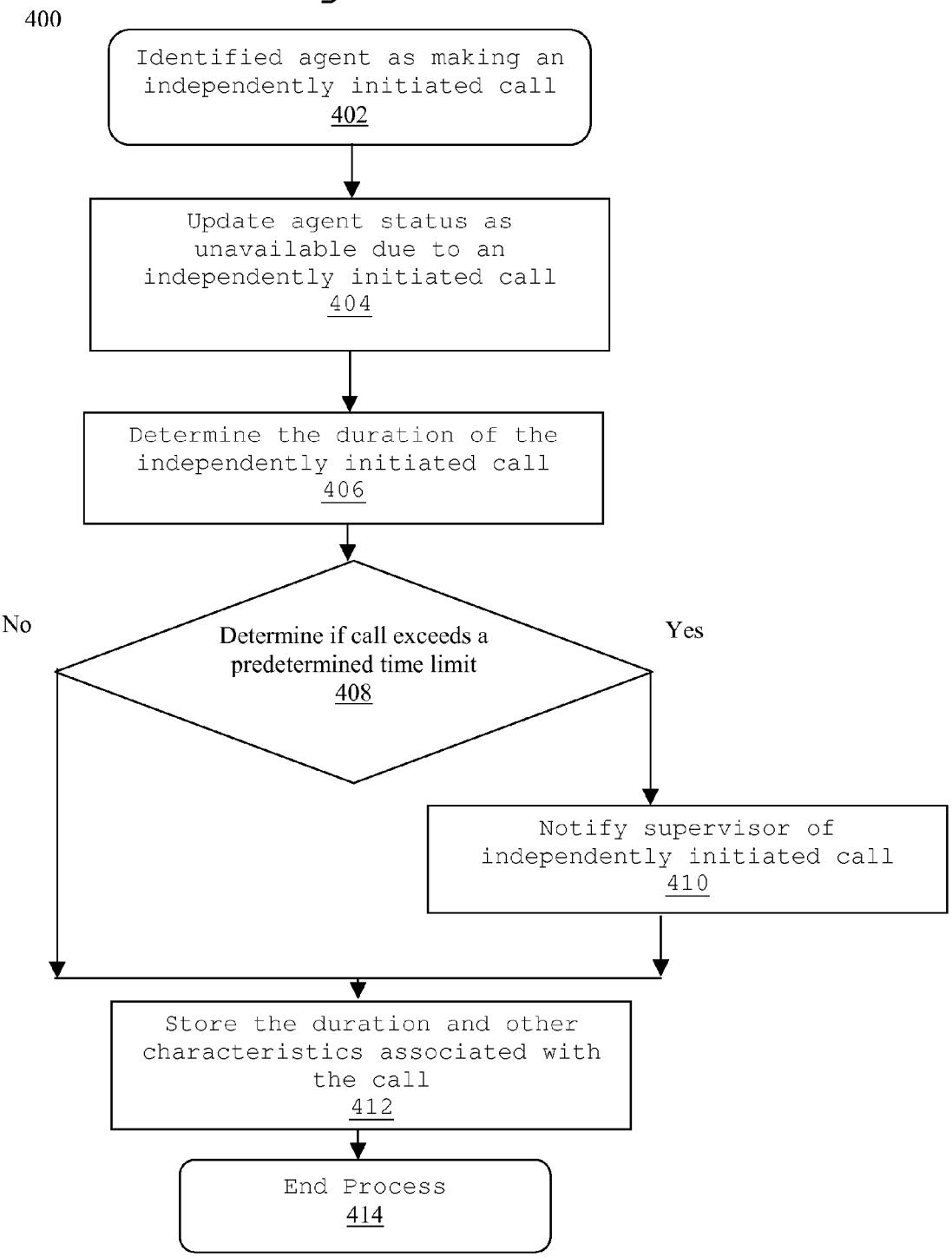

AUTOMATED AGENT AVAILABILITY DETECTION

TECHNICAL FIELD

The present invention relates to call centers and more particularly, relates to detecting agent status in a call center.

BACKGROUND INFORMATION

A growing number of businesses have begun using call centers to handle interactions with customers. Companies typically use call center services, for example, to manage outbound and inbound communication campaigns to potential customers for telemarketing or to existing customers for collecting information or customer follow-up. Agents are expected to rapidly supply information for various campaigns of the call center. Automatic Call Distribution (ACD) systems assist the agent in placing and receiving calls. Such systems are typically used to distribute incoming calls among a plurality of agents. The ACD may utilize a switch, which may control the dialing and connection of each telephone of each agent.

The ACD may receive calls for inbound campaigns or place calls for outbound campaigns and connect the calls to an available agent of the call center. The ACD system may assign calls to available agents based on specialties associated with a particular agent or in a round-robin fashion. The ACD system determines if the agent is not currently handling a customer. Some ACD systems have a direct communication channel with each individual telephone and are signaled by the phone when the phone is in use. However, such ACD systems require dedicated hardware/software that allow the individual phone and server or switch of the system to communicate with each other.

Other ACD systems detect when the telephone of the agent is in use. If the line is in use the system connects the customer with the next available agent. Although the ACD system is able to determine if the telephone is in use, the ACD system is unable to determine if the agent is currently handling a customer or if the agent has dialed-out using the dial pad of the telephone. Accordingly, there is a need for a system for a contact center that allows a telephone call center management system to identify when an agent has made a telephone call outside the controls of the call center management system. In addition, there is a need to alert the system resources as well as supervisors when an agent as manually initiated a call and the duration of telephone calls initiated by the agent.

SUMMARY

Accordingly, the present invention is a novel system and device for automatically detecting the status of an agent in a call center. An exemplary method may involve switching calls to a telephone of the agent in the call center. The method may detect a manually initiated off-hook status of at least the telephone. The method may then signal a switch that the agent at the telephone is unavailable and prevent switching calls to the telephone when a manually initiated off-hook status is detected.

Embodiments of the invention may have one or more of the following features. According to one exemplary embodiment, the action automatically detecting status of an agent may involve detecting a current status of said telephone and storing a connected status of connected calls to said telephones by said switch. According to another exemplary embodiment, the action automatically detecting status of an agent may involve comparing the current status with the connected status and determining a manually connected status when the current status is active and the connected status is inactive. In another embodiment, the method may communicate to a workstation of a supervisor when the act of detecting a manually initiated off-hook status detects a manually initiated off-hook status. The method may also communicate to call center resources the duration of time that the agent remains on a manually initiated off-hook call.

BRIEF DESCRIPTION OF THE DRAWINGS

These and other features and advantages of the present invention will be better understood by reading the following detailed description, taken together with the drawings wherein:

FIG. 2 is a flow chart illustrating an exemplary embodiment of an agent status determination method according to the present invention.

FIG. 3 is a flow chart illustrating a first exemplary agent status notification embodiment according to the present invention.

FIG. 4 is a flow chart illustrating a second exemplary agent status notification embodiment according to the present invention.

DETAILED DESCRIPTION

Figure 1:
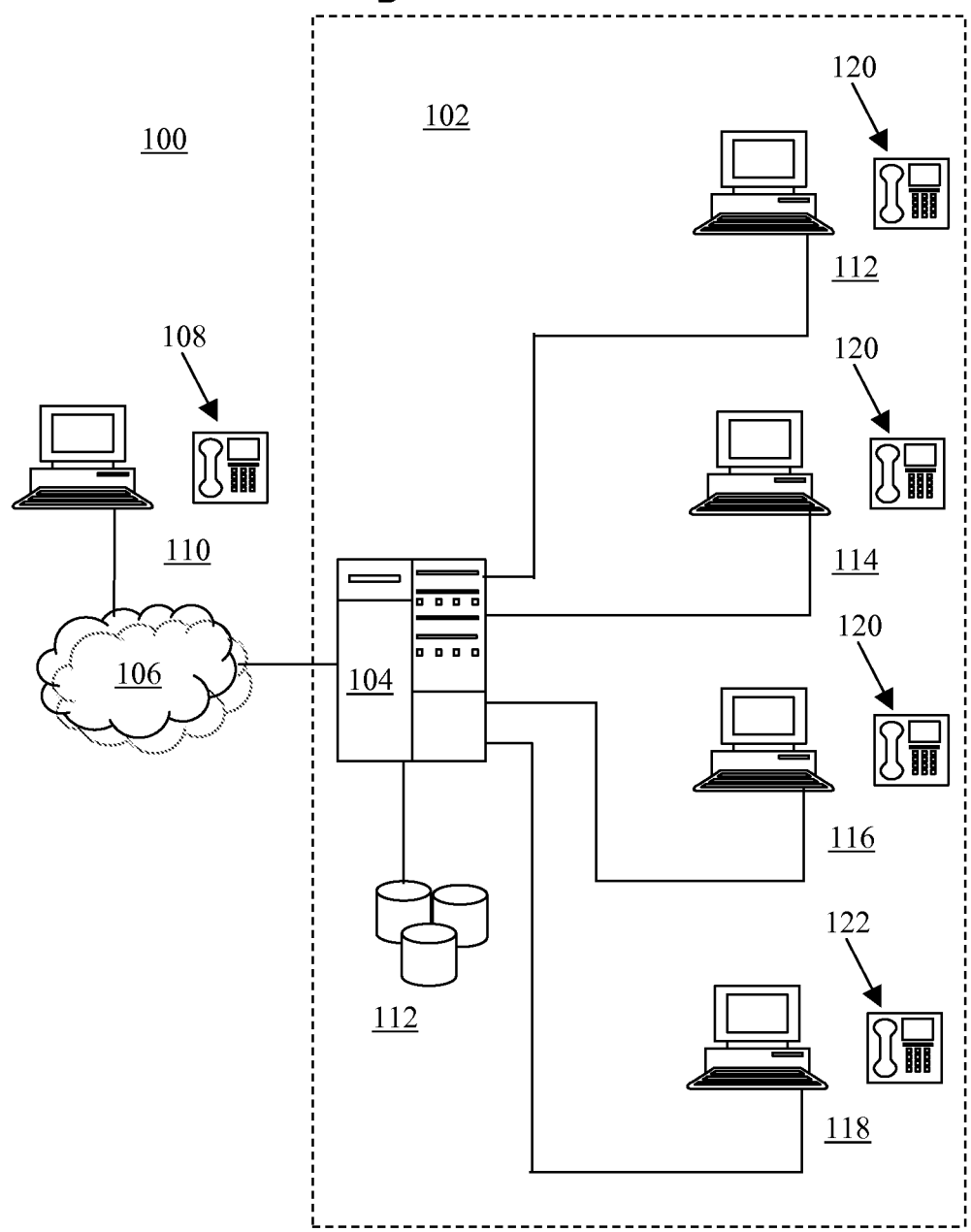
FIG. 1 is a system diagram of an exemplary agent status determination embodiment used to implement the present invention.

The system and method allow a call center to determine the status of an agent in the call center. The system and method allow the call center to determine if agents have initiated or received an outbound call outside the call center's systems and controls. The invention is applicable to the processing of incoming communications and outgoing communications. The exemplary embodiment may be used in, for example, but not limited to, automatic call distribution (ACD) systems, private branch exchange (PBX) systems, computer telephony systems, telemarketing systems, communication management systems or a combination of these systems.

FIG. 1 is an exemplary system diagram used to illustrate the agent status analysis method and system 100. A call center 102 has one or more trunk lines that connect an Automatic Call Distributor (ACD) or communication management server 104 to a communication network 106. The communication network 106 provides a communication link to a customer telephone 108 of a customer 110. The communication network 106 may be a variety of local area networks or wide area networks using a variety of protocols, for example, but not limited to, a Public Switched Telephone Network (PSTN), an Internet Protocol (IP) network using Hypertext Markup Language (HTML) or Internet Protocol Network Telephony (IPNT) or a combination of networks and protocols. For illustrative purposes, the communication network 106 shows only one customer 110 transmitting and receiving communications, however, the communication network 106 would have many customers and couple to other communication networks (not shown) that may supply additional customers.

The communication management server 104 routes telephone calls from the communication network 106 to agents of the call center. In the exemplary communication network 100, the call center 102 has three agents (a first agent 112, a second agent 114, and a third agent 116) to handle communications sent and received by the call center 102. An agent telephone 120 is provided to each agent of the call center 102. The agents 112, 114, and 116 of the call center 102 respond to communications placed to the call center 102 by the customer 110. The agents 112, 114, and 116 provide the customer 110 with the desired information or the desired action of the customer 110.

An agent supervisor 118 is responsible for reviewing the work of the agents 112, 114, and 116. The supervisor oversees the progress of campaigns by the communication management server 104 and each individual agent. The supervisor may have a workstation and a telephone 122 to assist and oversee the status of campaigns and the agents 112, 114, and 116. If an agent cannot satisfy a request of a customer, the supervisor 118 may be summoned to aid in resolving the request. The customer may be transferred to the supervisor 118 or a three-way conference may be facilitated.

For example, the customer 110 may want to book a Caribbean cruise. The customer 110 places a telephone communication to the call center 102. An automated audio or touch-tone prompting and response system of the communication management server 104 may identify that the customer 110 wishes to book a Caribbean cruise. The communication manager server 104 routes the telephone communication to the agent responsible for handling Caribbean cruise bookings. In this example, the second agent 114 may be the agent authorized to book Caribbean cruises. The communication management server 102 routes the call to the second agent 114. The second agent 114 answers the call and books the cruise for the customer 110. If the customer 110 needs further assistance the supervisor 118 may be alerted to assist the process.

The communication management server 104 generally routes telephone calls from the communication network 106 to the telephone of the agents 112, 114, and 116. The communication management server 104 may store an agent's status. Once a customer call has been switched to the agent, the communication management server 104 may store an agent's status as unavailable. The communication management server 104 may continually monitor the line of the customer 110 and agent 114 to determine when the call has been disconnected. The communication management server 104 then updates the status of the agent to available, identifying the agent as able to handle another customer.

An agent sometimes, independently of the communication management server 104, dials an outside number for personal or other reasons, for example, the agent may dial "911" in an emergency. The communication management server 104 may determine that the agent has made an independent call outside the controls of the communication management server 104. The communication management server 104 determines that the line of the agent is in use and that the previously stored status of the agent is identified as "available". The communication management server 104 may therefore determine that the agent has made an independent call.

The communication management server 104 may then continuously monitor the call to determine the duration of the call. The communication management server 104 may also update the status of an agent to identify that the agent is on an independent call. This alerts supervisor 118 and other monitoring equipment that the call is not a routine call and may require other actions from the routine customer call.

For example, the communication management server 104 may not record the call since the call may be of a personal nature. The communication management server 104 may perform other actions, for example, alerting a supervisor 118. If the situation were an emergency the supervisor 118 may need to take necessary corrective actions. The supervisor may also be alerted to prevent agents from pursuing personal matters during work time. The communication management server 104 may send an immediate alert to the supervisor 118 to notify the supervisor 118 that the agent is no longer available to receive calls.

In another example, the communication management server 104 may put into action other procedures. For example, the communication management server 104 or other equipment in the call center 102 may log the duration of independent calls or other characteristics of the independent calls for later review. In another example, the supervisor 118 may be alerted only when an independent call exceeds a set amount of time, for example, if the call exceeds ten minutes, the supervisor 118 may be alerted. The log of independent calls may be used by the supervisor 118 to review an agent's performance.

From a hardware perspective (not shown), the communication management server 102 may utilize network interfaces, switching fabric, one or more processors, memory, and service circuitry. The one or more trunk lines connect the communication network 106 to the interface of the communication management server 104. The interface of the communication management server 104 also couples to the various agents 112, 114, and 116 and supervisors 118 servicing the call center 102. The communication management server 104 receives the communication from the customer 110 and routes the communication to an agent 112, 114, and 116. The switching fabric allows the communication management server 104 to selectively switch and distribute the various lines of communication between customers 110 and agents 112, 114, and 116. The memory stores the programs and data associated with the agent status and information that may be needed to process the communications. The processors execute the stored routines and interfaces with the switching fabric to distribute the communication based on the logic provided by the stored routines. The service circuitry may provide specialized tasks to efficiently use the processor resources of the communication management server 104. For example, the service circuitry may provide audio prompts or collect information associated with routing the communication. The above hardware is an exemplary configuration for illustrative purposes. A variety of other computer, microprocessor, storage devices, and additional hardware components and configurations may be used in combination with the above hardware components.

A flow chart illustrating an exemplary agent status determining method 200 of the invention is shown in FIG. 2. The exemplary agent status determination method 200 allows the communication management server 104 to determine if an agent 112, 114, and 116 has independently initiated a telephone call. The method of the exemplary agent status determining method 200 begins when the communication management server 104 (block 202) initiates an agent status check. The communication management server 104 determines the current status of the agent's telephone line (block 204). The communication management server 104 may perform this operation by checking the line for a dial tone, communicating directly with the agent's telephone, or some other method of detecting the status of the telephone line. If the telephone line is inactive, the communication management server 104 may connect the customer to the agent (block 206).

If the telephone line is active, the communication management server 104 determines the logged status of the agent (block 208). As previously discussed, the logged status is the stored status of the agent by the communication management server 104. When a customer is connected to the agent, the communication management server 104 updates the status of the agent to active. The communication management server 104 continues to monitor the call and updates the agent status to inactive once the call with the customer is completed. If the telephone line of the agent is active and the logged agent status is active, the communication management server 104 determines that the agent is still handling a customer and proceeds to the next available agent to connect the customer call (block 210). If the telephone line of the agent is active and the logged agent status is inactive, the communication management server 104 determines that the agent has initiated an independent call directly from the keypad of the agent's telephone (block 212). The communication management server 104 proceeds to the next available agent to connect the customer call (block 210).

A flow chart illustrating an exemplary method of the invention when an agent is determined to have made an independently initiated call 300 is shown in FIG. 3. Once the communication management server 104 has determined an independently initiated call has been made (block 302), the agent status may be updated to a status of active or other status to identify the agent as unavailable due to an independently initiated call (block 304). The communication management server 104 may also notify the supervisor of the independently initiated call (block 306). This may be a part of the routine when an independently initiated call is detected or may be a separate routine that searches the agent's status on a periodic basis. The notification may be in the form of, for example, an email or an alert that is signaled within an application used to monitor the call center 102 by the supervisor 118.

The method may also determine the duration of the independently initiated call (block 308). This may be accomplished by routinely detecting the activity of the telephone line until an inactive state is detected or other method to determine when the call is disconnected. The communication management server 104 may store the duration and other characteristics of the call for later retrieval (block 310). For example, the call center may store the independently initiated call statistics in a folder associated with the agent. A summary of the independent calls may be used later when reviewing the agent's performance. Once the detection and logging process is complete the communication management server 104 proceeds to the next monitoring process (block 312).

A flow chart illustrating a second exemplary method of the invention when an agent is determined to have made an independently initiated call 400 is shown in FIG. 4. Once the communication management server 104 has determined an independently initiated call has been made (block 402), the agent status may be updated to a status of active or other status to identify the agent as unavailable due to an independently initiated call (block 404). The method continues to monitor the length of time elapsed since the connection of the independently initiated call (block 406). If the time exceeds a predetermined time limit, the supervisor 118 may be notified of the call (block 410). If the time is under the time limit, the supervisor 118 may not be notified and the characteristics of the call may be stored for later use. This method allows the supervisor 118 to only be alerted when an agent makes an independent call and exceeds a reasonable time limit. The process ends and is initiated when the next independently initiated call is detected (block 414).

The prior examples are for illustrative purposes. Modifications and substitutions by one of ordinary skill in the art are considered to be within the scope of the present invention, which is not to be limited except by the following claims.

The invention claimed is:

1. A system for automatically detecting status of an agent of a plurality of agents in a call center comprising:
   a call center management system;
   a plurality of agent workstations coupled to said call center management system;
   a plurality of telephones associated with said plurality of agent workstations;
   a switch for automatically connecting calls to said plurality of telephones;
   a communication management server connected to said plurality of telephones and connected to a communication network;
   an off-hook detector, located in said communication management server, automatically detecting a manually connected status of at least one of said telephones, wherein said manually connected status indicates said agent at said at least one of said telephones has made an independently initiated call that is outside of control of said switch, wherein said off-hook detector signals said switch that said agent at said at least one of said telephones is not connected to a call through said switch, but is unavailable, wherein said switch will not automatically connect a call to said agent;
   wherein said off-hook detector further comprises:
      a telephone status detection device, detecting a current status of said at least one of said telephone, wherein said current status is either available or unavailable;
      a status memory, storing a connected status of automatically connected calls to said at least one of said telephones by said switch wherein said connected status is either connected or not connected;
      a status comparator, comparing said current status with said connected status for each of said telephones and determining the following:
      said current status of available and said connected status of not connected indicating said at least one of said telephones is not in use;
      said current status of unavailable and said connected status of connected indicating said at least one of said telephones is handling a call connected by said switch; and
      said current status of unavailable and said connected status of not connected indicating said at least one of said telephones is handling a call that was manually initiated by said agent of said at least one of said telephones indicating said manually connected status;
   an alerting device, notifying a workstation of a supervisor when said off-hook detector detects said manually connected status; notifying said supervisor of a duration of said manually connected status exceeding a predetermined time limit; and
   removing a telephone of an agent associated with said manually connected status from one of an automatic call distribution queue and a predictive dialer campaign.

2. A system for automatically detecting status of said agent of claim 1 wherein said off-hook detector further comprises:
   a telephone status detection device, detecting said current status of said at least one of said telephones, wherein said current status is either available or unavailable;
   said status comparator, comparing said current status with a prior status, wherein said prior status is either connected or not connected, and determining said manually connected status when said current status is unavailable and said prior status is not connected.

3. A method for automatically detecting status of an agent of a plurality of agents in a call center comprising the acts of:
   coupling a plurality of agent workstations to said call center;

associating a plurality of telephones with said plurality of agent workstations;

automatically connecting calls with a switch to said plurality of telephones in the call center;

connecting a communication management server to said plurality of telephones and to a communication network;

automatically detecting, with an off-hook detector located in said communication management server, a manually initiated off-hook status of at least one of said plurality of telephones, wherein said manually initiated off-hook status indicates that said agent has made an independently initiated call that is outside of control of said switch and;

signaling, with said off-hook detector, said switch that said agent at said at least one of said plurality of telephones is not connected to a call through said switch, but is unavailable; and preventing connecting calls, by said switch, to said agent when said manually initiated off-hook status is detected wherein said off-hook detector further comprises:

detecting, by a telephone status detection device, a current status of said at least one of said telephones, wherein said current status is either available or unavailable;

storing, in a status memory, a connected status of automatically connected calls to said at least one of said telephones by said switch wherein said connected status is either connected or not connected;

comparing by a status comparator, said current status with said connected status for each of said telephones and determining the following:

said current status of available and said connected status of not connected indicating said at least one of said telephones is not in use;

said current status of unavailable and said connected status of connected indicating said at least one of said telephones is handling a call connected by said switch; and said current status of unavailable and said connected status of not connected indicating said at least one of said telephones is handling a call that was manually initiated by said agent of said at least one of said telephones indicating said manually connected status;

notifying, by an alerting device, a workstation of a supervisor when said off-hook detector detects said manually connected status; notifying said supervisor of a duration of said manually connected status exceeding a predetermined time limit; and removing a telephone of an agent associated with said manually connected status from one of an automatic call distribution queue and a predictive dialer campaign.

4. A method for automatically detecting status of said agent of claim 3 wherein said off-hook detector further comprises:

detecting said current status of said at least one of said telephones, wherein said current status is either available or unavailable; and comparing said current status with a prior status, wherein said prior status is either not connected or connected and determining said manually initiated off-hook status when said current status is unavailable and said prior status is not connected.

\* \* \* \* \*